US011958455B2

(12) United States Patent
Durm et al.

(10) Patent No.: US 11,958,455 B2
(45) Date of Patent: Apr. 16, 2024

(54) MOTOR VEHICLE HAVING A BRAKE UNIT

(71) Applicant: Dr. Ing. h.c. F. Porsche Aktiengesellschaft, Stuttgart (DE)

(72) Inventors: Tiemo Durm, Muehlacker-Duerrmenz (DE); Gerhard Robens, Pforzheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 371 days.

(21) Appl. No.: 17/316,772

(22) Filed: May 11, 2021

(65) Prior Publication Data
US 2021/0354680 A1 Nov. 18, 2021

(30) Foreign Application Priority Data

May 12, 2020 (DE) ...................... 10 2020 112 751.0

(51) Int. Cl.
*B60T 13/56* (2006.01)
*B60T 17/08* (2006.01)
*F16M 13/02* (2006.01)

(52) U.S. Cl.
CPC .......... *B60T 17/088* (2013.01); *F16M 13/02* (2013.01)

(58) Field of Classification Search
CPC ........ B60T 17/088; B60T 13/57; F16M 13/02
USPC ........................................ 91/376 R; 180/315
See application file for complete search history.

(56) References Cited

U.S. PATENT DOCUMENTS

| | | | | |
|---|---|---|---|---|
| 8,375,843 B2* | 2/2013 | Calvo | ...................... | F16F 13/02 303/114.3 |
| 8,567,550 B2* | 10/2013 | Kim | ........................ | B60T 13/56 180/315 |
| 8,777,333 B2* | 7/2014 | Martinez | ............... | B60T 13/567 303/114.3 |
| 2005/0139062 A1* | 6/2005 | Verbo | ................... | B60T 13/567 91/376 R |
| 2011/0162922 A1 | 7/2011 | Martinez et al. | | |
| 2012/0205180 A1 | 8/2012 | Kim | | |
| 2013/0075211 A1 | 3/2013 | Plantan et al. | | |
| 2013/0340422 A1 | 12/2013 | Inoue et al. | | |
| 2015/0344016 A1 | 12/2015 | Tarandek | | |

FOREIGN PATENT DOCUMENTS

| | | |
|---|---|---|
| CN | 101415591 A | 4/2009 |
| DE | 102013223087 A1 | 7/2014 |
| DE | 102015002142 A1 | 8/2016 |

* cited by examiner

*Primary Examiner* — Todd M Epps
(74) *Attorney, Agent, or Firm* — LEYDIG, VOIT & MAYER, LTD.

(57) ABSTRACT

A motor vehicle having a bulkhead includes: a brake unit, a housing of which is fastenable to the bulkhead of the motor vehicle. An actuating member for actuation of the brake unit extends through the bulkhead. A radial flange is provided on a housing surface facing toward the bulkhead. On the bulkhead, there is provided at least one corresponding fastening element which at least partially engages around the radial flange.

11 Claims, 1 Drawing Sheet

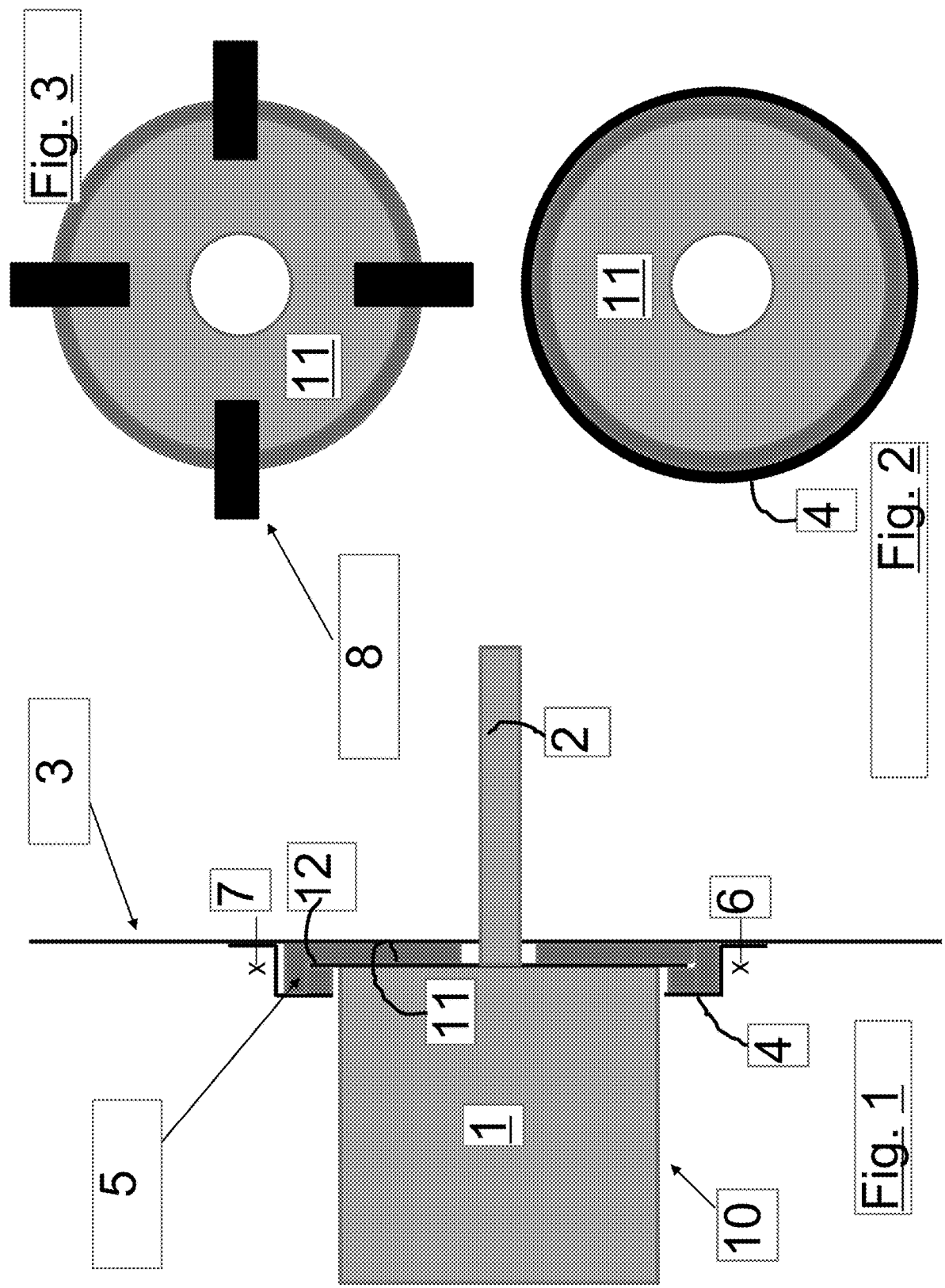

MOTOR VEHICLE HAVING A BRAKE UNIT

CROSS-REFERENCE TO PRIOR APPLICATION

Priority is claimed to German Patent Application No. DE 10 2020 112 751.0, filed on May 12, 2020, the entire disclosure of which is hereby incorporated by reference herein.

FIELD

The invention relates to a motor vehicle having a brake unit, the housing of which is fastenable to a bulkhead of the motor vehicle, wherein an actuating member for the actuation of the brake unit extends through the bulkhead.

BACKGROUND

Modern brake units have not only an electric drive for actuating the tandem master cylinder but also hydraulic valves and a hydraulic pressure-generating means such as a pump. With future ever-increasing functionalities in the autonomous driving sector, control interventions are increasingly being performed autonomously, for which reason the demands on the noise behavior of the brake unit are ever-increasing owing to the high relevance with regard to comfort.

In the case of brake units mounted on the vehicle bulkhead, a direct introduction of structure-borne sound into the motor vehicle occurs. Here, the bulkhead can serve as an amplifying diaphragm surface. This structure-borne sound is radiated by the bulkhead and reaches the occupants in virtually unimpeded fashion.

It is known from the prior art for the brake unit to be mounted on a bearing block, which is in turn fastened in acoustically decoupled fashion to the bulkhead, as presented in DE 10 2015 002 142 A1.

A disadvantage of the known fastening arrangement is that the structural space conditions in the region of the bulkhead generally do not allow the provision of a separate bearing block.

SUMMARY

In an embodiment, the present invention provides a motor vehicle having a bulkhead, the motor vehicle comprising: a brake unit, a housing of which is fastenable to the bulkhead of the motor vehicle, wherein an actuating member for actuation of the brake unit extends through the bulkhead, wherein a radial flange is provided on a housing surface facing toward the bulkhead, and wherein, on the bulkhead, there is provided at least one corresponding fastening element which at least partially engages around the radial flange.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1. is a sectional illustration of a brake unit fastened to the bulkhead of a motor vehicle;

FIG. 2. shows a first alternative of a fastening element; and

FIG. 3. shows a second alternative of the fastening element.

DETAILED DESCRIPTION

In an embodiment, the present invention improves a motor vehicle having a brake unit fastened to the bulkhead so as to allow a space-saving and structural-space-optimized fastening, with simultaneously high demands on acoustic decoupling.

In an embodiment, the present invention provides a motor vehicle having the features described herein. Here, it is provided according to the invention that a radial flange is provided on a housing surface facing toward the bulkhead, and that, on the bulkhead, there is provided at least one corresponding fastening element which at least partially engages around the flange.

One advantageous refinement of the concept of the invention provides that a vibration-damping element is arranged between the bulkhead and the housing surface facing toward the bulkhead. The vibration-damping element furthermore arranged between the flange and the bulkhead. Furthermore, the vibration-damping element is arranged between the flange and the at least one fastening element such that the vibration-damping element surrounds the flange and there is no direct contact between fastening element and flange. By means of these measures, the brake unit is acoustically decoupled from the bulkhead. At the same time, a structural-space-optimized solution is realized which requires virtually no additional structural space.

In a first alternative, the fastening element is designed as a rotationally symmetrical collar which engages around the flange of the housing and the vibration-damping element.

In a second alternative, the fastening element is formed by multiple clamps, wherein the flange of the housing and the vibration-damping element are engaged around by the clamps at multiple receiving points.

In both alternatives, the fastening element is designed such that there is no direct contact between the fastening element and the housing of the brake unit. By means of this measure, no vibrations can be transmitted from the housing of the brake unit to the bulkhead.

The vibration-damping element is preferably manufactured from an elastomer.

The fastening element is fastened in non-positively locking or positively locking fashion to the bulkhead and is realized preferably by means of a screw connection or a welded connection. An adhesive connection or riveted connection is likewise conceivable.

FIG. 1 shows a bulkhead 3 of a motor vehicle, onto which a brake unit 1 has been mounted. As already mentioned in the introduction, modern brake units have not only an electric drive for actuating the tandem master cylinder but also hydraulic valves and a hydraulic pressure-generating means such as a pump. The actuation of these components can transmit vibrations via a housing 10 of the brake unit 1 to the bulkhead 3 of the motor vehicle. Since the bulkhead 3 can have the effect of amplifying these vibrations, acoustic decoupling is implemented. As can also be seen from FIG. 1, an actuating member 2 for the actuation of the brake unit 1 extends through the bulkhead 3. Facing the bulkhead 3 is a housing surface 11 of the housing 10 of the brake unit 1.

A radial flange 12 is now provided on the housing 10 at the housing surface 11. Said flange is of encircling design and serves for the fastening of the brake unit 1 as discussed in more detail below: On the bulkhead 3, there is provided a corresponding fastening element 4, 8 which at least partially engages around the flange 12. In order that an acoustically decoupled fastening is realized, provision is now made for a vibration-damping element 5 to be provided which extends over all contact surfaces between the housing 10 of the brake unit 1 and the bulkhead 3. There is thus no longer direct contact, and the acoustic decoupling is realized.

The vibration-damping element 5 fully embeds the flange 12. Here, the vibration-damping element 5 is arranged both between the bulkhead 3 and the housing surface 11 facing toward the bulkhead 3 and furthermore between the flange 12 and the bulkhead 3. Furthermore, the vibration-damping element 5 is arranged between the flange 12 and the fastening element 4, 8 such that the vibration-damping element 5 surrounds the flange 12 and there is no direct contact between fastening element 4, 8 and flange 12.

The fastening elements 4, 8 are in turn designed such that there is no direct contact between the fastening element 4, 8 and the housing 10 of the brake unit 1. In this way, acoustic coupling is prevented. The fastening elements 4, 8 are fastened in non-positively locking or positively locking fashion to the bulkhead 3. The non-positively locking or positively locking connection is realized by means of a screw connection 6 or a welded connection 7. An adhesive connection or riveted connection is likewise conceivable.

FIG. 2 now shows that the fastening element is designed as a rotationally symmetrical collar 4 and engages around the flange 12 of the housing 10 and the vibration-damping element 5. This assumes that the housing 10 is likewise rotationally symmetrical. Different geometries are likewise conceivable in this regard. The collar 4 would then correspondingly follow the geometry of the housing 10 in encircling fashion.

An alternative is illustrated in FIG. 3. The fastening element is formed by multiple clamps 8, also referred to as clamping jaws, and engages around the flange 12 and the vibration-damping element 5 at multiple receiving points. This alternative may be of interest specifically from the aspect of restricted structural space, because the clamps 8 do not need to be arranged symmetrically, but can be arranged asymmetrically in a manner dependent on the available structural space.

A rigid screw connection and a fatigue-resistant screw connection configuration are furthermore possible. In the event of aging-induced failure of the vibration-damping element 5, the brake unit 1 is held securely in the motor vehicle. In the safety-critical sector of ABS control, that is to say in the case of high forces being exerted on the actuating member 2, the elastomer is overcompressed and the assembly is quasi-rigid in engagement in order to ensure an optimum transmission of force.

The vibration-damping element 5 is formed from elastomer and can additionally also be utilized for sealing with respect to water.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A motor vehicle having a bulkhead, the motor vehicle comprising:
   a brake unit, a housing of which is fastenable to the bulkhead of the motor vehicle,
   wherein an actuating member for actuation of the brake unit extends through the bulkhead,
   wherein a radial flange is on a housing surface of the housing facing toward the bulkhead,
   wherein a fastening element is fastened to the bulkhead,
   wherein a vibration-damping element is between the radial flange and the fastening element,
   wherein the fastening element, the vibration-damping element, and the radial flange are configured to collectively fasten the housing to the bulkhead of the motor vehicle such that the brake unit is acoustically decoupled from the bulkhead, and
   wherein there is no direct contact between the fastening element and the radial flange.

2. A motor vehicle, the motor vehicle comprising:
   a bulkhead;
   a brake unit comprising an electric drive and a housing, the housing being fastened to the bulkhead in a acoustically-decoupled manner, a radial flange being on a housing surface of the housing that faces toward the bulkhead
   an actuating member, which is configured to actuate the brake unit, extends through the bulkhead;
   a fastening element fastened to the bulkhead, the fastening element comprising a collar or clamps, the fastening element engaging around the radial flange to fasten the housing to the bulkhead;
   a vibration damper, which comprises an elastomer, arranged between the fastening element and the radial flange such that there is no direct contact between the fastening element and the radial flange, and no direct contact between brake unit and the bulkhead.

3. A motor vehicle having a bulkhead, the motor vehicle comprising:
   a brake unit, a housing of which is fastenable to the bulkhead of the motor vehicle,
   wherein an actuating member for actuation of the brake unit extends through the bulkhead,
   wherein a radial flange is provided on a housing surface facing toward the bulkhead,
   wherein there is at least one corresponding fastening element on the bulkhead, wherein the at least one corresponding fasting element at least partially engages around the radial flange, and wherein a vibration-damping element is arranged between the bulkhead and the housing surface facing toward the bulkhead.

4. The motor vehicle of claim 3, wherein the vibration-damping element is arranged between the radial flange and the bulkhead.

5. The motor vehicle of claim 3, wherein the vibration-damping element is arranged between the radial flange and the at least one corresponding fastening element such that the vibration-damping element surrounds the radial flange without direct contact between the at least one corresponding fastening element and radial flange.

6. The motor vehicle of claim 3, wherein the at least one corresponding fastening element is formed by multiple clamps and engages around the radial flange of the housing and the vibration-damping element at multiple receiving points.

7. The motor vehicle of claim 3, wherein the vibration-damping element comprises an elastomer.

8. The motor vehicle of claim 3, wherein the at least one corresponding fastening element comprises a rotationally symmetrical collar and engages around the radial flange of the housing and the vibration-damping element.

9. The motor vehicle of claim 8, wherein the at least one corresponding fastening element is configured so that there is no direct contact between the at least one corresponding fastening element and the housing of the brake unit.

10. The motor vehicle of claim 9, wherein the at least one corresponding fastening element is fastened in a non-positively locking connection or positively locking connection to the bulkhead.

11. The motor vehicle of claim 10, wherein the non-positively locking connection or positively locking connection between the at least one corresponding fastening element and the bulkhead comprises a screw connection or a welded connection.

* * * * *